B. BARTLEY.
BALANCE MEANS FOR MACHINERY.
APPLICATION FILED OCT. 16, 1913.
1,168,460.
Patented Jan. 18, 1916.
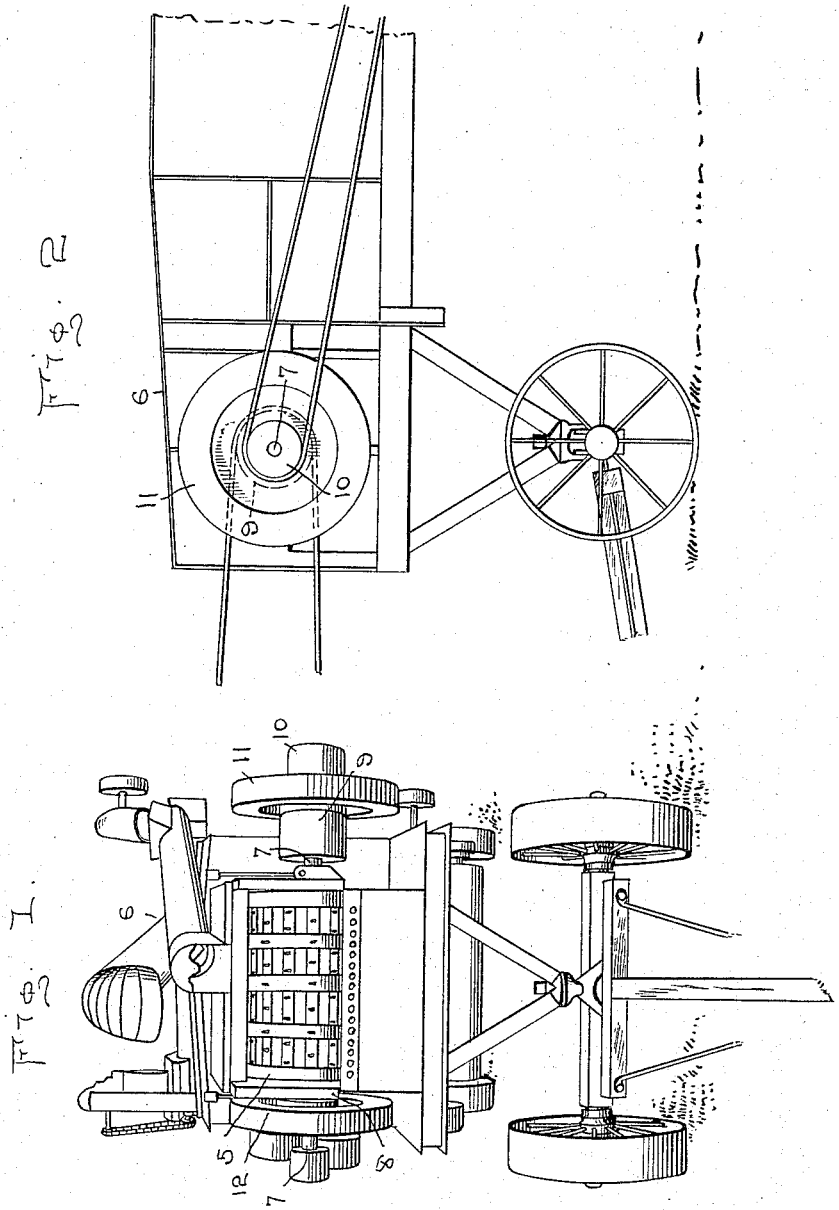
Witnesses
Inventor
B. Bartley
By W. J. FitzGerald & Co
Attorney

UNITED STATES PATENT OFFICE.

BEN BARTLEY, OF NEW HAVEN, KENTUCKY.

BALANCE MEANS FOR MACHINERY.

1,168,460.  Specification of Letters Patent.  Patented Jan. 18, 1916.

Application filed October 16, 1913. Serial No. 795,544.

*To all whom it may concern:*

Be it known that I, BEN BARTLEY, a citizen of the United States, residing at New Haven, in the county of Nelson and State of Kentucky, have invented certain new and useful Improvements in Balance Means for Machinery; and I do hereby declare the following to be a full, clear, and exact description of the invention, such as will enable others skilled in the art to which it appertains to make and use the same.

This invention relates to balance means and more particularly to balance means for the cylinders of threshing machines.

A fault common to many types of machines, is the fact that in cases of forced feeding, there is a momentary stop or pause, thus causing shocks and unevenness in running, and it is the object of this invention to correct these disadvantages and faults, by providing the shafts with heavy balance wheels, so that smooth and even running and freedom from shocks is assured. This object may be obtained by means of the combination and arrangement of parts hereinafter more fully described and claimed, and illustrated in the accompanying drawings in which, like characters of reference indicate like parts in the figures, of which, Figure 1 represents a perspective view of a threshing machine showing the invention applied thereto and, Fig. 2 represents a side elevational view of a portion of the machine showing the invention applied thereon.

Referring more particularly to the drawing, the cylinder 5 of the threshing machine 6, which illustrates a well known type of threshing machine, has its shaft 7 extended on both sides of the frame 8, and provided with a drive pulley 9 and a blower pulley 10, and between the two is keyed or otherwise secured on the shaft 7, a heavy balance wheel 11, a similar balance wheel 12 being secured on the shaft, on the opposite side of the frame from the wheel 11. The balance wheel 11 may be secured to the shaft in close proximity to the frame as is the wheel 12, if so desired.

The proportion and weight of the balance wheels attached to machines of different sizes and capacity, will be varied in accordance with the proportions of the machine, and in accordance with the heaviness of the work done, it being understood in this connection, that the weight and proportions of the balance wheels are optional.

It has been found by experiment that a threshing machine equipped with balance wheels as described, is very smooth and even in running and is free from shocks, and that it may be run with considerable less steam pressure when equipped with the balance wheels, thus effecting a material saving in fuel.

Although I have described the preferred combination and arrangement of parts, I reserve and may exercise the right to make such changes in the combination and arrangement as do not depart from the spirit of the invention and the scope of the appended claim.

Having thus fully described my invention what I claim as new and desire to secure by Letters Patent is;

A balance means for machinery comprising a driving shaft for a threshing machine cylinder, a driving pulley carried by the shaft at one end thereof, a belt driving the pulley, a second pulley spaced from the driving pulley and at the same end of the shaft, a belt on the second pulley extending in the direction opposite to that of the first named belt, a fly wheel on the shaft between said pulleys, a third pulley mounted on the shaft at the opposite end thereof adapted to receive a belt extending in the same or a direction opposite to the first named belt, and a second fly wheel carried by the driving shaft at the end of the shaft occupied by the last named pulley.

In testimony whereof I have signed my name to this specification in the presence of two subscribing witnesses.

BEN $\overset{\text{his}}{\times}$ BARTLEY.
mark

Witnesses:
W. F. CHRISTIAN,
GUY S. BEAM.

Copies of this patent may be obtained for five cents each, by addressing the "Commissioner of Patents, Washington, D. C."